UNITED STATES PATENT OFFICE.

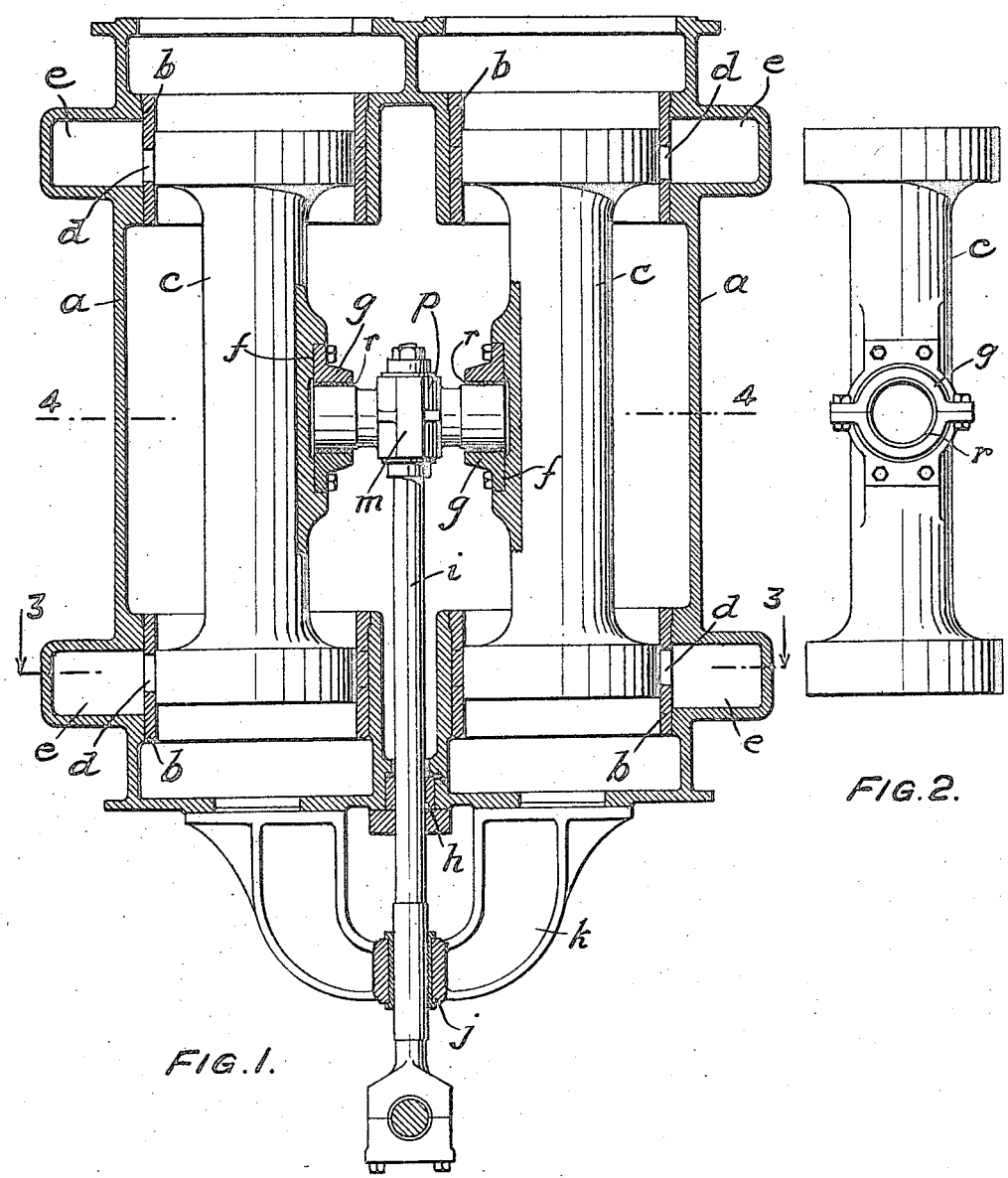

EDWARD T. CUNLIFFE, OF AUDUBON, NEW JERSEY, ASSIGNOR TO SUN SHIPBUILDING COMPANY, OF CHESTER, PENNSYLVANIA, A CORPORATION OF PENNSYLVANIA.

STEAM-ENGINE VALVE MECHANISM.

1,419,362.  Specification of Letters Patent.  Patented June 13, 1922.

Application filed March 19, 1920. Serial No. 367,171.

*To all whom it may concern:*

Be it known that I, EDWARD T. CUNLIFFE, a citizen of the United States, residing at Audubon, county of Camden, and State of New Jersey, have invented a new and useful Improvement in Steam-Engine Valve Mechanism, of which the following is a full, clear, and exact description, reference being had to the accompanying drawings, which form a part of this specification.

My invention relates to that type of steam engine wherein the admission and exhaust of motive fluid to the engine cylinder is controlled by a plurality of circular valves reciprocable in a valve chest casing.

The object of my invention is to provide new means for actuating the valves whereby any change in valve centers due to expansion of metal may take place without displacement of the valve-reciprocating mechanism and without affecting the driving connection between such mechanism and the valves.

My invention comprises means for effecting this object and possesses other advantages to which reference is made hereinafter.

A preferred embodiment of the invention is shown in the drawings, in which—

Fig. 1 is a vertical sectional view through the valve chest casing.

Fig. 2 is an elevation of one of the valves looking toward the bearing-carrying side thereof.

The valve chest casing $a$ is provided with two pairs of liners $b$ in which slide the circular heads of the valves $c$. The valve casing liners are ported at $d$ to communicate with chambers $e$ communicating with the respective ends of the engine cylinder. Reciprocation of the valves $c$ admits steam from the valve chest casing to one end of the engine cylinder while allowing exhaust from the other end of the cylinder, and vice versa. This arrangement of valves, valve chest and engine cylinder is well known, my invention relating to the means for actuating the valves.

The bodies of the two valves are provided with facings $f$. Circular bearings $g$ are inserted in recesses in these facings. Each bearing is made preferably of two semicircular parts bolted to each other and each bolted to its facing.

A reciprocatory valve actuating rod or stem $i$ extends through packing $h$ in the center of the bottom of the valve chest casing into the interiors of the casing midway between the two valves $c$. Below the casing the stem slides through a bearing $j$ in a guide $k$ dependent from the casing. At the upper end of the stem $i$ is a cross-head $p$. This cross-head has a laterally extending arm $m$ slidable in a recessed guide $n$ on a door $o$ giving access to the casing.

The ends of the cross-head $p$ are of cylindrical contour and fit within bushings $r$ within the circular bearings $g$.

As the ends of the cross-head and the bearings are of circular form, the abutting faces of the bearings $g$ can be cut away and said bearing members moved toward each other along the valve bodies to take up any wear on the ends of the cross-head. As the ends of the cross-head and bearings $g$ are arranged to move laterally with relation to each other, any shifting of the centres of the valves, due to expansion or contraction, will be taken care of by the shifting of the bearing $g$ along the ends of the cross-head.

Figure 3:
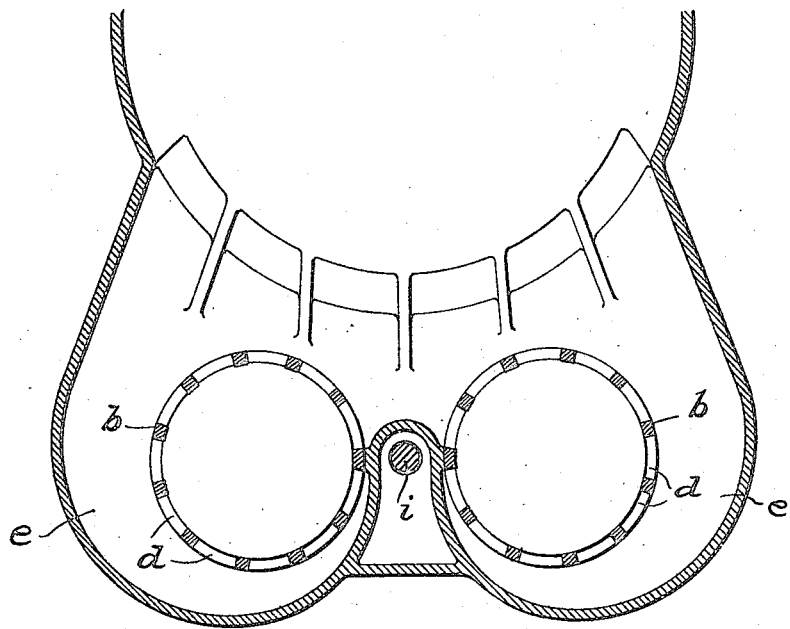
Fig. 3 is a cross-section on the line 3—3 of Fig. 1.
Figure 4:
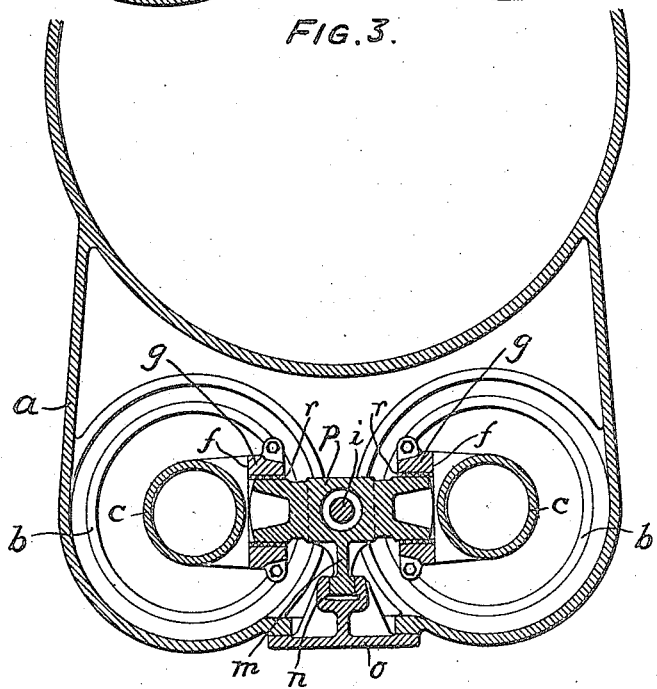
Fig. 4 is a cross-section on the line 4—4 of Fig. 1.

The valves may be readily removed by unbolting and removing the bearings $g$ and turning the valve-actuating stem $i$ on its axis, the ends of the cross-head being curved convexly, as shown in Fig. 4, to allow clearance of the valve facings.

By the use of twin valves for controlling the steam admission to, and exhaust from, a cylinder of large area, sufficient port area can be provided with valves of small diameter, which will not become leaky, as readily as a valve of large diameter, and can be more readily and cheaply manufactured and handled than a single large valve giving the same port area.

The use of twin valves for a single cylinder also permits the reduction of the over-all dimensions of the engine in one direction, namely: across the cylinder and steam chest, without increasing, in the other direction, the width of the steam chest beyond the outer diameter of the cylinder.

Having now fully described my invention, what I claim and desire to protect by Letters Patent is:

1. In a steam engine, a cylinder for a reciprocating piston, a valve casing at the side thereof, a steam chamber intermediate the ends of the casing, an exhaust chamber in each end of the casing, a steam and exhaust passage between each exhaust chamber and the steam chamber communicating with the piston cylinder, two valve cylinders in each end of the casing opening into the steam chamber and the exhaust chamber at that end and extending across the intermediate passage, there being ports through the walls of the valve cylinders opening into the interior of said cylinders and said passages, each of the valve cylinders in one end being in alignment with one of the valve cylinders in the other end, a valve having a cylindrical head at each end and an intermediate body mounted in each pair of valve cylinders in alignment with each other, said valves being in alignment with the piston cylinder, a removable bearing on each valve, a cross-head in the steam chamber connected to the bearings of both valves, and a connecting rod extending into the steam chamber connected to the cross head for reciprocating the valves.

2. In a steam engine, a cylinder for a reciprocating piston, a valve casing at the side thereof, a steam chamber intermediate the ends of the casing, an exhaust chamber in each end of the casing, a steam and exhaust passage between each exhaust chamber and the steam chamber communicating with the piston cylinder, two valve cylinders in each end of the casing opening into the steam chamber and the exhaust chamber at that end and extending across the intermediate passage, there being ports through the walls of the valve cylinders opening into the interior of said cylinders and said passages, each of the valve cylinders in one end being in alignment with one of the valve cylinders in the other end, a valve having a cylindrical head at each end and an intermediate body mounted in each pair of valve cylinders in alignment with each other, said valves being in alignment with the piston cylinder, a cross head in the steam chamber, a connecting rod extending through one end wall of the valve casing, laterally extending projections on the cross-head, and removable bearings connected to the valves for the projections on the cross-head.

3. A steam engine having a steam chest, twin valves therein, each valve having two cylindrical heads, a connecting rod, a cross-head removably connected to the connecting rod, laterally extending projections on the cross-head, and removable seating members for the projections secured to the valves, said projections and seating members being arranged to permit the shifting of the valves by expansion and contraction in a lateral direction along the projections with relation to the cross-head.

4. A steam engine having a steam chest, twin valves therein, each valve having two cylindrical heads and a connecting body, a connecting rod, a cross-head removably connected to the connecting rod, two laterally extending cylindrical projections on the cross-head, a split bearing for each projection, and means for adjustably securing the split bearings to the valve bodies to permit taking up wear, said projections and bearings being arranged to permit the shifting of the valves in a lateral direction by expansion and contraction of the steam chest, and to permit the shifting of the valves about the axis of the pins if the center line of the valves should be thrown out of line with the center line of the connecting rod.

5. Valve mechanism for steam engines comprising a valve chest casing, a plurality of valves slidable therein, opposed bearings carried by the valves, an actuating stem extending within the valve chest casing between the valves, a cross-head on the stem engaging said bearings, said bearings being slidable relatively to the cross-head in the direction of extension of the cross-head, an access door, and mutually engaging members on the door and cross-head by which the actuating stem is guided.

In testimony of which invention, I have hereunto set my hand, at Chester, on this 21st day of February, 1920.

EDWARD T. CUNLIFFE.